United States Patent [19]

Searle

[11] Patent Number: 4,503,326
[45] Date of Patent: Mar. 5, 1985

[54] FIBER OPTIC OPTICAL DEVICE

[75] Inventor: Robert F. Searle, Amherst, N.H.

[73] Assignee: Vibrac Corporation, Amherst, N.H.

[21] Appl. No.: 528,257

[22] Filed: Aug. 31, 1983

Related U.S. Application Data

[62] Division of Ser. No. 256,080, Apr. 21, 1981, Pat. No. 4,430,566.

[51] Int. Cl.$^3$ .............................................. G02B 5/14
[52] U.S. Cl. ................................... 250/227; 350/96.24
[58] Field of Search ................ 250/216, 227, 231 SE; 350/96.24, 96.25, 96.26, 96.27

[56] References Cited

U.S. PATENT DOCUMENTS 3,987,300 10/1976 Palmer .................................. 250/227
3,992,620 11/1976 Waller .................................. 250/227
4,117,460 9/1978 Walworth et al. ................... 250/227
4,240,066 12/1980 Lenox .................................. 250/227
4,284,353 8/1981 Yoshida et al. ...................... 250/227

*Primary Examiner*—David C. Nelms
*Attorney, Agent, or Firm*—Schiller & Pandiscio

[57] ABSTRACT

An electro-optical angular displacement transducer incorporates a pair of encoding disks to produce a varying moire intereference pattern sensitive to angular displacement of one disk relative to the other. The disks are illuminated by a fiber optic bundle over substantially a full 360 degree annulus concentric with the disks. A similar fiber optic bundle is used to collect the light transmitted through the disks and supply it to a detector.

5 Claims, 5 Drawing Figures

FIBER OPTIC OPTICAL DEVICE

This application is a divisional application of copending application Ser. No. 256,080 filed Apr. 21, 1981 now U.S. Pat. No. 4,430,566.

This invention relates to angular displacement transducers, and more particularly to electro-optical transducers wherein angular deflections produce changes in a moire interference pattern, the moire interference pattern being used to provide an electrical output related to the deflection.

Electro-optical angular displacement transducers are well known. A common type consists of one or more light sources illuminating a like number of photodetectors through a pair of coaxially mounted encoded disks. The disks are commonly encoded with like patterns of alternating transparent and opaque radial sectors or spokes. The optics are so arranged that the photodetectors see a moire intereference pattern caused by the superposition of one disk upon the other. Angular displacement of the two disks relative to each other causes the moire interefence pattern to vary. Thus, the photodetector sees an optical signal which, among other things, is dependent upon the angular displacement between the disks. The disks may be either independently mounted to a pair of shafts, so as to accurately measure small angular displacements of one shaft relative to the other, or may be mounted to two ends of a single shaft, so as to measure torsional deflection of the shaft. The latter type transducer is described for instance in U.S. Pat. Nos. 2,136,223 and 3,111,028.

In those applications in which the shaft rotates through an angle larger than the angular displacement being measured, such transducers frequently display first and higher order harmonic fluctuations in signal output unrelated to any angular displacement between the code disks. Such fluctuations may be caused by a number of factors. Runout (i.e. radial eccentricity of shaft and disks) causes a varying segment of the moire patterns to be projected onto the detector as the shaft rotates and may also lead to an angularly varying moire. Either of the effects may produce a signal fluctuation which is unrelated to the angular displacement of one disk relative to the other. Variation in size, spacing, or radial alignment of the light transmissive sectors of one disk relative to those of the other may also produce an angularly varying moire intereference pattern. Lack of commensuration between the angular extent of the disks viewed by the photodetector and the angular pattern of transmissive and non-transmissive sectors of the disks results in a varying illumination of the photodetector as the shadows of the rotating disks' opaque sectors alternately move onto and off of the detector.

As described in U.S. Pat. No. 3,495,452, these problems may be partially overcome by (1) summing the signals from a matched pair of light source-photodetector systems disposed in diametrically opposed relationship about the shaft (thereby averaging out the fluctuations due to runout) and (2) fabricating one of the two disks as the exact negative of the other (thereby minimizing the fluctuations due to variations in size, spacing, and alignment of the pair of disks). Additionally, dimensioning the photodetectors so as to be illuminated simultaneously by a number of alternating transmissive and opaque sectors together with precise dimensioning and alignment insure that the optical signal received by each photodetector is transmitted by an angular extent of each disk which is commensurate, or nearly so, with the sector pattern, thereby smoothing out the high order harmonic fluctuations due to the motion of the shadows of the opaque sectors onto and off of the detector.

While greatly reducing the problem, the approach just described still requires matched illumination sources, matched photodetectors, and proper alignment of the disks. Slight variations from the ideal for any of these results in a small first or higher order harmonic fluctuation which, while of no consequence in many applications, is serious in others. This is particularly true in cases involving digitization of the output signal of a torque transducer of the type shown in U.S. Pat. No. 3,495,452, since it is nearly impossible to so precisely match and align photodetectors as to avoid a harmonic fluctuation in the device's analog output when the shaft is rotated under constant torque. It should also be noted that the need for precision matching and alignment of the pairs of components adds to the cost of manufacture. Further, the long-term maintenance-free reliability of such a transducer is problematic, inasmuch as the output of the sources, the sensitivity of the detectors, and the precision of their alignment are all subject to change with time, resulting in eventual mismatch and missalignment.

In prior art transducers, the size of the code disks are often dictated by electro-optical, rather than mechanical, considerations. Thus, the linearity of the transducer's response to angular deflection requires that the projection of one disk upon the other by the light source be an equi-area projection. This is most commonly achieved by designing the system so that the radiation passing through the pair of disks from a single small source has only slight vergency compared to the ratio of the disks' separation and pattern spacing; alternatively, the disks may be illuminated by a large uniform diffuse source. Further, maximum signal-to-noise can be achieved only if the full photosensitive surface of the photodetector is used. As a consequence of these design considerations, the radial extent of the observed portion of the disks must have linear dimensions on the order of the linear aperture of the photodetector, which in many cases is of the order of or greater than the diameter of the required shaft. In this respect it should be noted that the size of the disk affects the reponse time of the transducer, a larger disk having a larger inertia and consequently tending to damp rapid responses. This is important in the design of transducers to measure briefly applied torques from fractional horsepower devices (e.g., stepper motors).

It is an object of the present invention to overcome the disadvantages of prior art transducers just outlined. Accordingly, an object of the present invention is to provide a electro-optical angular deflection transducer in which the harmonic fluctuations are minimized. Further, it is an object of the present invention to provide such a transducer which does not require matching pairs of illumination sources and photodetectors. It is also an object of the present invention to provide a transducer which does not require extensive alignment procedures in its manufacture or maintenance. Yet another object of the present invention is to provide an electro-optical angular deflection transducer which is not subject to harmonic fluctuations arising because of changes in mechanical alignment or the aging of sources or photodetectors. Further, it is an object of the present invention to provide a transducer having a rapid response suitable for the measurement of briefly applied torques from fractional horsepower devices.

These and other objects are met in the present invention of an electro-optical transducer in which the encoding disks are illuminated and observed by annular optical means. A single illumination source is used to substantially uniformly illuminate an annulus of the encoding disks. A similar optical means is used to collect this annulus of illumination in a substantially uniform way and provide it to a single photodetector. The two annular optical means include a pair of fiber optic bundles so fabricated as to be substantially coaxial with one another and with the shaft supporting the encoding disks. As the moire pattern due to the projection of one encoding disk on the other is sampled through a full 360 degrees, any angular variation of the moire pattern due to eccentric mounting of the disks is averaged out. This same illumination and sampling scheme also reduces or eliminates the effect of any fluctuations due to radial variations in the moire pattern or produced by a varying angular extent of the pattern observed and introduced because of an eccentrically mounted disk pair. As taught by the prior art, variation in the sizes, spacing or radial alignment of the light transmissive segments of one disk relative to those of the other disk can be eliminated through making the disks negative copies of one another. Inasmuch as the full 360 degrees of the disks are sampled, the shadows of the opaque sectors do not move onto and off of the detector, and higher order harmonic fluctuations due to slight differences between the angular extent of detected illumination and an integral multiple of the angular spacing of the secotors are therefore eliminated. Finally, inasmuch as supplementary portions of each disk are not illuminated by different light sources and observed by different detectors, the matching of sources and detectors and the problems arising from mismatch due to aging are also eliminated.

Inasmuch as the annulus of light passing through the pair of disks may be used to fill the entire active surface of the photodetector, the area of the annulus may be made equal to the area of the detector. This contrasts with the prior art wherein the radial extent of the disks must be on the order of the linear aperture of the detector. As a consequence, code disks with outer diameters only slightly larger than the shaft diameter are possible in the present invention. This reduction in disk size results in smaller disk inertia, and consequently, more rapid transducer response.

Other features, objects and advantages of the invention are described or rendered obvious by the following detailed specification which is to be considered together with the accompanying drawings, in which.

In all figures, like numbers refer to like members.

Figure 1:
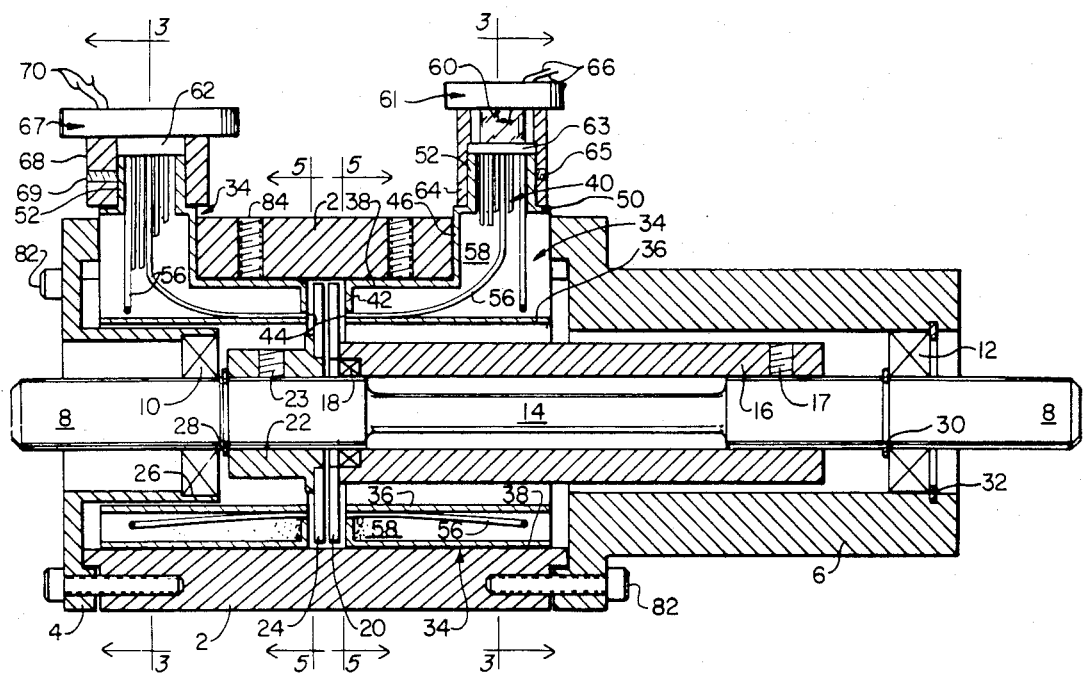
FIG. 1 is a longitudinal sectional view in elevation of a preferred embodiment of the invention incorporated into a torque transducer.

Referring now to FIG. 1, there may be seen a preferred embodiment of the present invention, which is incorporated into a torque transducer for purposes of illustration. The transducer includes a housing consisting of a cylindrical case 2 closed off at its opposite ends by removable members 4 and 6. Preferably, but not necessarily, the end members 4 and 6 are attached to the case 2 by bolting so as to facilitate assembly and disassembly. End members 4 and 6 are provided with aligned center holes in which torque shaft 8 is supported by means of suitable bearings 10 and 12. Intermediated its ends the torque shaft 8 includes a reduced diameter portion 14. The cross sectional area of reduced diameter portion 14 and the length thereof determines the torque range of the device.

Mounted on torque shaft 8 is sleeve 16. Sleeve 16 surrounds the reduced diameter portion 14 and is connected at one end to an end of torque shaft 8 by a set screw 17. The opposite end of sleeve 16 has an enlarged internal diameter to accomodate a bearing 18. Attached to this same end of sleeve 16 is a disk 20, details of which are described hereinafter. Also mounted on torque shaft 8 is a second substantially shorter sleeve 22. Sleeve 22 is attached to the large diameter portion of shaft 8 which supports bearing 18 by a set screw 23. Attached to sleeve 22 is a second disk 24, details of which are also described hereinafter. Disks 20 and 24 are preferably cemented, as by epoxy, to the facing ends of sleeves 16 and 22. However, those skilled in the art will readily recognize that disks 20 and 24 can be attached to sleeves 16 and 22 by screws or other suitable fastening means. Sleeves 16 and 22 support disks 20 and 24 in parallel confronting closely spaced relation to each other, with a gap between them preferably on the order of 1/16 of an inch (1.5 mm) or less.

Although not shown in detail, it is to be understood that bearings 10 and 12 are of roller pin, needle, or ball bearing type and comprise inner and outer races separated by roller pins, balls, or the like. The outer race of bearing 10 is seated in a counterbore 26 in end member 4. The outer race of bearing 10 is maintained in contact with the end member 4 under the pressure exerted by retaining ring 28, set into shaft 8, on the inner race of bearing 10. Axial movement of shaft 8 away from end member 4 is prevented by a snap-type retaining ring 30 that is locked in a groove on shaft 8 and bears against the inner race of bearing 12. Bearing 12 is held in place by means of another snap-type retaining ring 32 that is locked to end member 6 and engages the outer race of the bearing. With this arrangement shaft 8 is capable of rotation relative to the housing formed by cylindrical case 2, end member 4, and end member 6. Disks 20 and 24 rotate with the shaft.

It will be appreciated that bearings 10 and 12 could be spaced apart on shaft 8 by other means. For example, their inner races might rest against shoulders provided on the shaft or against sleeves 16 and 22.

In practice one end of torque shaft 8 is coupled to a drive means capable of applying thereto rotational mechanical power supplied by a suitable power source, e.g., an electric motor (not shown). The opposite end of torque shaft 8 is generally coupled to an energy absorbing or converting device (also not shown) such that torque applied by the drive means is transmitted by way of the torsionally deformable torque shaft 8. As power is transmitted the torque shaft 8 is torsionally deformed so that there is a relative angular displacement between the two ends of the shaft. Since disks 20 and 24 are coupled to opposite ends of shaft 8 by sleeves 16 and 22, the two disks will rotate relative to each other according to the torsional deformation of the reduced diameter portion 14 of the shaft. At this point it is to be appreciated that to the extent described the device of FIG. 1 is adapted for dynamic torsional load measurements. However, it is also adapted for reaction torque measurements. For the latter purpose means may be provided for locking one end of torque shaft 8 to the housing so that the torque shaft cannot rotate relative to the housing. It should also be noted that disks 20 and 24 could be coupled to independent shafts or the like, whereby the relative angular motion between a pair of members could be determined. While not illustrated, it is to be understood that such embodiments are not beyond the bounds of the present invention.

Also forming a part of the device of FIG. 1 are a pair of optical coupling means generally designated by numeral 34. Each optical coupling means 34 comprises inner and outer housings, 36 and 38 respectively, surrounding, supporting, and protecting optical coupling 40. As may best be seen by reference to FIG. 3, inner and outer housings 36 and 38 are thin walled substantially concentric right circular cylindrical members disposed one inside the other with their ends substantially coplanar. The inside diameter of inner housing 36 is chosen to freely accomodate sleeves 16 and 22, bearing 10, and the internal structure of end member 4, yet be less than the outer diameter of disks 20 and 24. The outside diameter of outer housing 38 is chosen to be substantially equal to the inside diameter of cylindrical case 2, with allowance for a snug sliding fit between the housing and the case. As may be seen in FIG. 1, one end of outer housing 38 is provided with an internal flange 42. Flange 42 extends normal to the axis of the cylindrical wall of outer housing 38, and has an inside diameter concentric with the cylinder, larger than the outside diameter of inner housing 36, yet smaller than the outside diameters of disks 20 and 24. As may best be seen in FIG. 5, flange 42 and inner housing 36 define between them an annular aperture 44.

Figure 2:
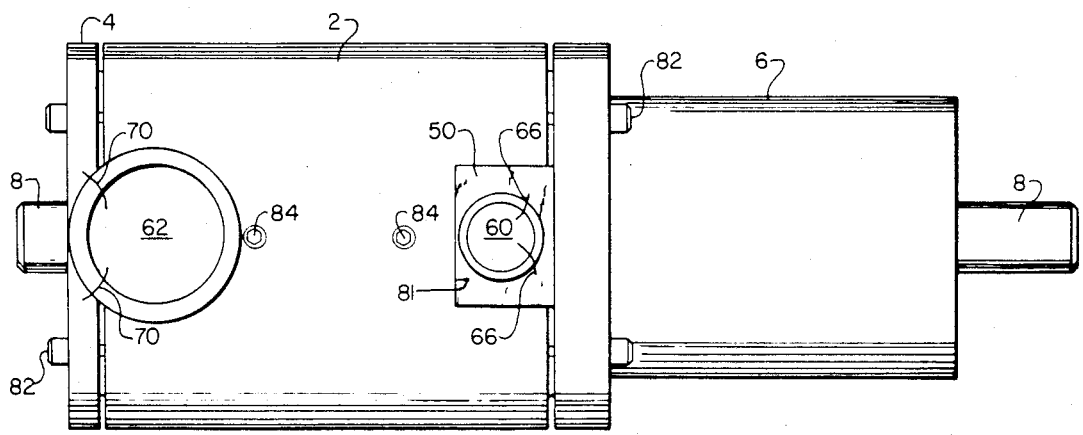
FIG. 2 is a plan view from above of the preferred embodiment of FIG. 1.

A portion of each outer housing 38 remote from flange 42 extends outward in an extension comprising end wall 46, side walls 48, outside wall 50, and post 52. End wall 46, which may be seen in section in FIG. 1, is in the form of a thin rectangular tab external to and extending radially from the cylindrical wall of outer housing 38. End wall 46 is located approximately at the mid point of outer housing 38. Side walls 48, which may be seen in section in FIG. 3, extend normal to end wall 46 from the end wall to the end of outer housing 38 remote from flange 42. End wall 46 and side walls 48 define an open-channeled rectangular extension of outer housing 38. The extent of this extension beyond the cylindrical wall of the housing is chosen to be on the order of the wall thickness of cylindrical case 2. The edges of end wall 46 and side walls 48 distant from the cylindrical form of outer housing 38 are capped by outside wall 50, which may be seen in section in FIGS. 1 and 3 and in plan in FIG. 2. Outside wall 50 is a thin wall of rectangular plan substantially normal to walls 46 and 48. Centrally disposed on outside wall 50 and communicating with the interior of the extension is post 52. Post 52 is a thin walled hollow right circular cylinder. The inside diameter of post 52 is chosen such that it provides a circular aperture 54 which is substantially equal to the diameter of the photosensitive surface of the detector, to be described, which forms the photosensitive portion of the transducer. It will be understood that this configuration is suitable for a photodetector which has a circular photosurface, and other shaped posts 52 and apertures 54 might be provided to accommodate differently configured detectors. The areas of annular aperture 44 and aperture 54 are preferably made to be substantially equal.

Figure 3:
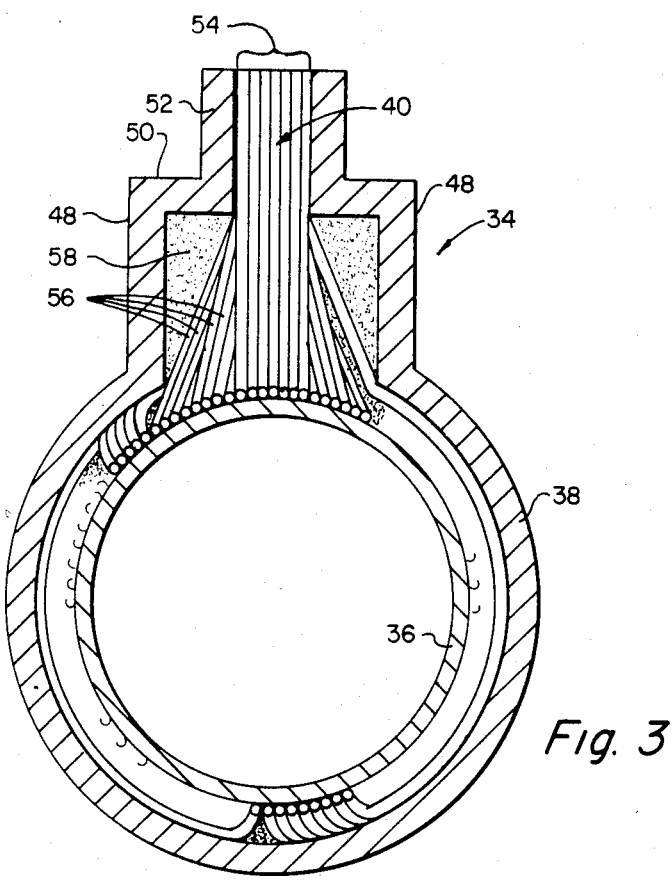
FIG. 3 is a partial section taken along either of the lines 3—3 of FIG. 1 illustrating a preferred embodiment of the annular illumination and collection means of the present invention.
Figure 5:
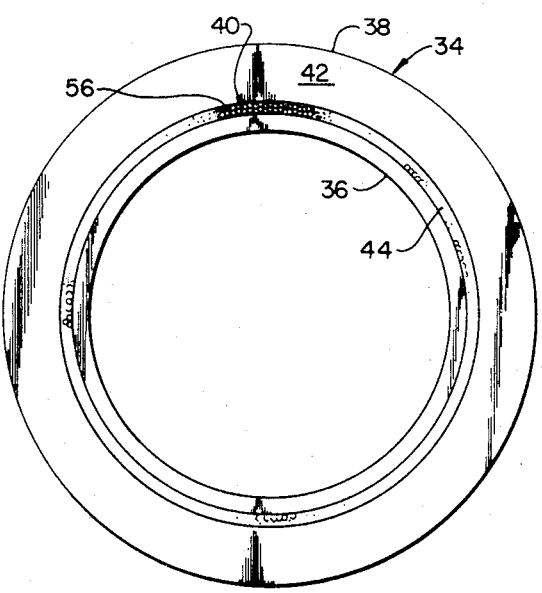
FIG. 5 is a partial end view taken along either of lines 5—5 of FIG. 1 showing the annular illumination and collection means of FIG. 3.

Optical coupling 40 communicates between annular aperture 44 and aperture 54, and optically transforms one into the other. For the embodiment described, optical coupling 40 is an annular-to-circular coupling. Preferably optical coupling 40 is a fiber optic coupling made up of a number of individual optical fibers 56, as may best be seen in FIGS. 1 and 3 (for clarity, only a few of the fibers making up the coupling are shown in the figures and the fibers shown in FIGS. 1 and 3 are of exaggerated diameter). Optical fibers 56 are individual fibers of circular cross section made of highly transparent material such as glass, quartz, or such polymers as polymethyl methacrylate, polystyrene, or the like. The diameter of each optical fiber is chosen to be less than the radial opening of annular aperture 44, and preferably considerably less, in order that a tightly packed bundle of fibers may substantially fill the entire aperture, as indicated in FIG. 5. Individual optical fibers 56 extend between annular aperture 44 and aperture 54, the totality of optical fibers 56 substantially filling both apertures. Optical fibers 56 are secured in place by a potting compound generally designated by numeral 58. As with the fibers, for clarity only some of the potting compound is indicated in FIGS. 1 and 3. Potting compound 58 can be any of a number of thermo-setting polymers. As is well known in the art of fiber optics, the individual optical fibers 56 may either be cladded with a lower refractive index material, or the potting compound 58 may be of a lower refractive index, in order to insure total internal reflection along the length of each fiber. Additionally, it is preferable that potting compound 58 be made opaque so as to exclude stray light. Preferably, but not necessarily, the individual optical fibers 56 terminating at annular aperture 44 of one optical coupling means 34 should be coherent with optical fibers 56 situated in the annular aperture 44 of the other optical coupling means. That is to say, the termination of each optical fiber 56 in one annular aperture 44 should be substantially a mirror image of the termination of a like fiber in the other annular aperture 44. It will be recognized by those skilled in the art of fiber optic fabrication, that this may be accomplished by fabricating pairs of fiber optic bundles initially as a single bundle the midpoint of which corresponds to the two annuli, and, after potting, cutting the bundle apart. Preferably, the termination of the individual fibers 56 in annular aperture 44 and aperture 54 are polished flush with the end of inner housing 36 and the external face of flange 42, and the end of post 52, respectively.

It will be appreciated that the inner and outer housing of optical coupling means 34 could also be of unitary construction with one another and the potting, being molded of a suitable polymer embedding a fiber optic bundle.

Post 52 of one of the optical coupling means 34 is provided with a light source generally noted as 60. The other post 52 is provided with a photosensitive detector generally denoted as 62. Light source 60 is preferably a miniature lightbulb of the type used in a flashlight mounted in a plastic housing 61 equiped with a diffuser 63. Diffuser 63 is used to diffuse the illumination from light source 60 so as to provide a substantially uniform intensity over aperture 54. Plastic housing 61 is provided with an extension in the form of a sleeve 64 dimensioned to fit over post 52. Sleeve 64 may be secured to post 52 as by set screw 65. It will be appreciated that sleeve 64 could be otherwise fixed to post 52, as by friction fit, by mating threads (in the case of cylindrical post and sleeve), or otherwise. Typically, each light source 60 is provided with a pair of lead wires 66 which may be connected to the power source (not shown) for the lightbulb.

Photosensitive detector 62 may be a photovoltaic, photoresitive, or other similar detector. Photosensitive detector 62 has a sensitive area chosen to be substantially the same as that of circular aperture 34. Photosensitive detector 62 is preferably encapsulated in a plastic body 67 provided with a sleeve 68 configured and dimensioned to fit over a post 52, positioning the photosensitive surface of the detector in confronting relationship with aperture 54. Sleeve 68 may be provided with a set screw 69 to affix the sleeve to the post. Typically the photosensitive detector 62 is provided with a pair of insulated lead wires 70, for connection to amplification, indication, and recording means (not shown). It will be understood that, as with light source 60, a common lead could be provided through a conductive case.

Figure 4:
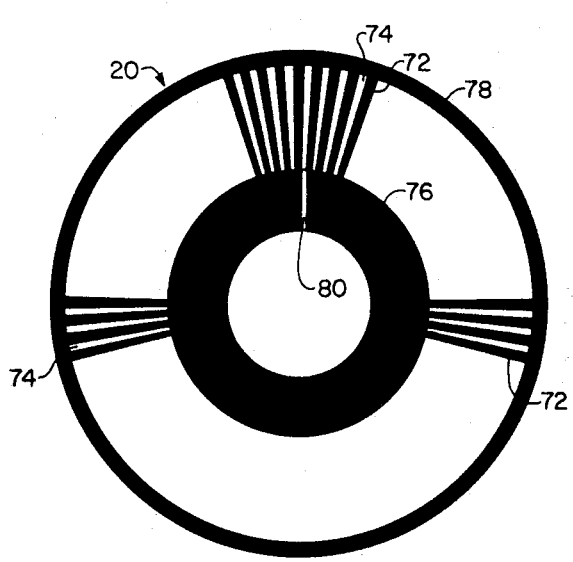
FIG. 4 is a partial illustration of one of the disks suitable for use in the device of FIG. 1.

Referring now to FIG. 4, there may be seen a disk 20. Disk 20 comprises a circular concentric array of alternately occuring radially-extending opaque and transparent sectors, 72 and 74 respectively, (for convenience of illustration, only a few sectors are shown) which surround a wide opaque band 76 and are surrounded by a thin opaque band 78. The outer diameter of band 76 and the inner diameter of band 78 are chosen to be respectively less than the outer diameter of inner housing 36 and greater than the inner diameter of flange 42 of optical coupling means 34. Opaque sectors 72 are identical with each other in lengths and width, each sector increasing in width with increasing distance from the center of the disk. The transparent sectors 74 are also identical to each other, having the same length and width with the width increasing with increasing distance from the center of the disk. Preferably the opaque sectors 72 have exactly the same width as the transparent sectors 74, but if desired the opaque sectors may have a greater or smaller width than the transparent sectors. In addition, it is preferable but not necessary that the separation between adjacent opaque sectors 72 (and transparent sectors 74) be on the order of several times the diameter of an optical fiber 56. Inner opaque band 76 is interrupted by a single radially extending transparent slit 80.

Disk 24 is the exact reverse of disk 20. Although disk 24 is not shown in detail, it is to be understood that in it the radially extending sectors 72, opaque in the case of disk 20, are transparent, while the radially extending sectors 74, transparent in disk 20, are opaque. Similarly, its inner and outer bands 76 and 78, opaque in the case of disk 20, are transparent. Radial slit 80, transparent for disk 20, is an opaque line in the case of disk 24.

In practice disks 20 and 24 are manufactured by preparing a drawing of the desired pattern, e.g. the pattern shown in FIG. 4. This drawing is then projected onto a glass disk coated with a photographic emulsion. The resulting latent image is then developed and fixed with a result that the disk provides a negative image of the pattern to which it has been exposed. Once the disk has been made, it is placed on the top of a second disk having a photographic emulsion, and the emulsion of the second disk is exposed to light projected through the first disk. The second disk is then photographically processed with the result that it presents a positive image of the pattern. This second disk corresponds to the illustration in FIG. 4, while it will be understood the other disk is its negative. It will be readily recognized by those skilled in the art that the pair of matched disks 20 and 24 could be manufactured by other means. For instance, the first disk could be made by incremental exposure of its emulsion using apparatus similar to a dividing engine. Then again, the opaque regions of each disk need not be the developed silver in a photographic image, but might be another metal left after a process of photoresitive etching. However, regardless of the process used to make the first disk, the second disk is preferably made directly from the first so that the pattern inscribed on the former is the reverse image of the pattern on the latter. Making one disk from the other insures that any irregularities or imperfections in the pattern in the first disk are carried over onto the second disk. Thus, for example, if the transparent sectors of the first disk are not all the same width or have ragged or imperfect edges, the same thing will be true of the opaque sectors of the second disk. The single radial slit 80 in opaque band 76 of disk 20, and the corresponding opaque radial line in the transparent band in the center of disk 24, facilitate alignment of the two disks when they are mounted on sleeves and 16 and 22. In this way the imperfections of one disk may be brought substantially in line with and thus effectively cancel out the corresponding imperfections of the other disk, as will be described.

Case 2 is dimensioned to be slightly larger than twice the length of an optical coupling means 34 by better than the sum of the thicknesses of disks 20 and 24. End members 4 and 6, bearings 10 and 12, and sleeves 16 and 22 are dimensioned and disposed such that when the transducer is fully assembled, disks 20 and 24 are situated astride the midpoint between the ends of case 2. Case 2 is provided with a pair of end notches 81, configured and dimensioned to tightly accommodate the extensions comprising end and side walls 46 and 48 respectively of outer housings 38. Notches 81 are rectangular openings penetrating through the wall of case 2 and spaced apart by a distance slightly greater than the sum of twice the separation between end walls 46 and flanges 42 of outer housings 38 plus the thicknesses of disks 20 and 24 plus a few millimeters clearance. In order to facilitate assembly of the various components to cylindrical case 2, the case may be provided with a plurality of tapped bores to accommodate bolts 82 and set screws 84. Bolts 82 may be provided to secure end members 4 and 6 to case 2, and consequently, blind tapped bores may be provided at either end of the case, with matching oversized through bores provided in the end members. Set screws 84 may be used to secure optical coupling means 34 within case 2, and consequently are tapped into through bores set radially into the case.

The assembly of the transducer may begin with the assembly of disks 20 and 24 onto their respective sleeves 16 and 22. These in turn are mounted onto shaft 8 so that sleeve 16 surrounds the reduced diameter portion 14 of the shaft and disks 20 and 24 are in close confronting relationship. The axial location of the sleeves and the disks may be controlled by seating sleeve 22 on retaining ring 28. A particularly convenient arrangement, suitable for sensing the direction of relative motion of the two disks as well as the amount of the displacement, requires disks 20 and 24 to be mounted so that (a) radial slit 80 on disk 20 and its negative radial line on disk 24 are at substantially the same angular position with respect to shaft 8 and (b) each opaque segment 72 of disk 20 interferes with and blocks exactly one half of the corresponding transparent segments of disk 24. This adjustment is facilitated by the provision of set screws 17 and 23 on sleeves 16 and 22 respectively.

One of the optical coupling means 34 is installed, annular aperture 44 foremost, into cylindrical case 2. Outer housing 38 of the coupling means, dimensioned to fit the interior of cylindrical case 2, centers the coupling means, while the extension formed by end and side walls 46 and 48 respectively, fitting a notch 81 of the case, locate the coupling means axially and angularly. In this regard, side walls 48 and notch 81 cooperate respectively in the manner of a key and a keyway to control the angular location of the coupling within the case, while end wall 46 and the notch control the (inward) axial location. When fully inserted, the optical coupling means 34 may be secured to the case by a set screw 84.

Shaft 8 may now be inserted, through the clear end of cylindrical case 2, to bring one of the disks 20 or 24 into confronting relationship with the annular aperture 44 of the installed optical coupling means 34. The appropriate bearing 26 or 30 may now be positioned on shaft 8, and the corresponding end member 4 or 6 positioned on the bearing and secured, by bolts 82, to the cylindrical case so as to abut the installed optical coupling means. The remaining optical coupling means 34 may now be installed in the clear end of cylindrical case 2, and the remaining bearing and end member secured to the case. Finally, light source 60 and photosensitive detector 62 may be installed on posts 62. In the completed assembly, the apertures 44 of the two optical coupling means 34 are aligned with one another at a radial distance from the axis of rotation of shaft 8 between the corresponding distances of bands 76 and 78 of disks 20 and 24.

With the arrangement of disks 20 and 24 as above described, the amount of light transmitted through the radial sectors 72 and 74 of the pair of disks will be approximately half of that incident on the transparent sectors of the unshadowed disk. Light source 60 and photosensitive detector 62 are preferably chosen such that the photosignal from the detector at this intensity is approximately halfway between the maximum and minimum operating limits of the photodetector. This enables the device to sense the direction, as well as the amount, of the angular displacement. Regardless of which way the shaft is rotated, torsional deflection thereof produces a relative rotation of the disks, which in turn results in a change in the magnitude of the illumination passing through the pair of disks and reaching photodetector 62. The photodetector provides a greater electrical signal when the relative rotation is such as to reduce the moire interference between the disks and a smaller electrical signal when the relative rotation is such as to increase the moire pattern.

It will be understood that if it is desired to operate the system to respond to angular deflections in only one direction from some null, or if direction sensing is not desired, the alignment of sectors 72 and 74 of the two disks may be different than that heretofore described. In particular, the sectors may be initially aligned, depending on the desired sense of the output signal with increasing angular deflection between the disks, to either completely obstruct the light or to allow maximum transmission.

In any event, the maximum photosignal the system is designed to linearly accommodate corresponds to the shadow of the opaque sectors of one disk falling wholly on the opaque sectors of the other (ideally, half of the light incident on the first disk being transmitted), while the minimum photosignal corresponds to the shadow of the opaque sectors of one disk falling wholly on the transparent sectors of the other (ideally, no light being transmitted).

The output signal from photosensitive detector 62 may be communicated by leads 70 to amplification, recording, and indicating means (not shown). Of course, the signal strengths may be calibrated so as to directly provide an indication of the applied torque.

As with the torque transducer in U.S. Pat. No. 3,495,452, the present transducer, because of the method of manufacturing the disks one from the other, and because of the way the disks are mounted with respect to each other, assures that irregularities in the pattern of one disk are substantially cancelled out by corresponding irregularities in the pattern of the other.

The essential feature of the present invention, namely, illuminating the disks in an annulus substantially centered on the disks' common axis and detecting the radiation transmitted through the disks about the entire circumference of this annulus, constitutes an improvement over the apparatus disclosed in U.S. Pat. No. 3,495,452, which requires a pair of photodetectors diametrically opposed to each other about the shaft, operating in conjunction with a pair of sources. As a consequence of the present invention, the analog output signal produced by detector 62 is essentially free of ripples and thus digitization of the output is more accurately accomplished.

The present invention also offers a number of other distinct advantages over the prior art. Firstly, it will be recognized that the method of manufacture of optical coupling means 34 insures the automatic alignment of light source 60 and photosensitive detector 62. Not only is this an advantage in assembly, it also insures against changing alignment as a result of vibration, shock, and the like. Then again, the present invention requires but a single light source 60 and photosensitive detector 62.

It will also be appreciated that the use of optical coupling means 34 also permits the illumination source and the photodetector to be situated external to the housing of the transducer, and therefore to be easily accessible for replacement or test. This is in contrast to prior art transducers in which alignment was insured and stray light eliminated by locating source and detector within the case. It might also be noted that the present design permits access to sleeve 16 and set screw 17 in an optically complete transducer, merely by removing end member 6. This permits simple realignment of disks 20 and 24, using light source 60 and photosensitive detector 70, should the integrity of the initial alignment of the disks be called into question.

It will be appreciated that while the invention has been described from the standpoint of a torque transducer, it is equally suitable for use in other angular displacement measuring applications. Thus, disks 20 and 24 might be supported by a pair of coaxial shafts, rather than a single shaft 8, the varying moire intereference pattern being a measure of the relative angular displacement of one shaft with respect to the other.

As previously noted, optical coupling means 34 might also be fabricated as a unitary structure of optical fibers embedded in a single cast piece, the potting compound not only securing the fibers, thereby defining the apertures, but also forming the inner and outer housings. It will also be understood that one or more of the optical fibers 56 communicating with the annular aperture could be directed to an aperture different from aperture 54, so as to provide optical signals corresponding to a single small segment of the annulus. Such signals could be used as clocking or tachometer signals, if desired. Alternatively, such signals could be provided by a wholly separate fiber bundle, communicating between a pair of special apertures independent of apertures 44 and 54.

Since these and certain other changes may be made in the above apparatus without departing from the scope of the invention herein involved, it is intended that all matter contained in the above description or shown in the accompanying drawings shall be interpreted in an illustrative and not in a limiting sense.

I claim:

1. An optical device comprising in combination:
   (a) an inner housing in the form of an elongate member having at one end an outer cylindrical portion with a first diameter;
   (b) an outer housing in the form of a hollow elongate member of similar length as said inner housing and dimensioned to fit about said inner housing in spaced-apart relationship, said outer housing having at one end an inner cylindrical portion defining a second diameter;
   (c) means supporting said inner and outer housings conterminous with one another in confronting spaced-apart relationship, thereby defining an interior space, and with said outer and inner cylindrical portions substantially concentric and coplanar with one another, thereby defining a first aperture of substantially annular form;
   (d) means for defining a second aperture, remote from, and not coaxial with, said first aperture;
   (e) means for transmitting light between substantially the entire expanse of said first aperture and said second aperture along a path, said means for transmitting and said path being wholly outside of said inner housing.

2. Apparatus as claimed in claim 1 wherein said inner and outer housings are of substantially right circular cylindrical form, said inner housing is hollow, and said inner and outer housings are disposed coaxially to one another.

3. An optical device according to claim 2 wherein further said outer housing includes an open, hollow outward projecting extension communicating with said interior space, and wherein further said means defining said second aperture is a portion of said extension remote from said interior space.

4. An optical device according to claim 2 wherein said means for transmitting is a fiber optic bundle, one end of said bundle terminating in a closed-packed arrangement of fibers substantially filling said first aperture.

5. An optical device according to claim 3 wherein said means for transmitting is a fiber optic bundle communicating through said interior space and said hollow extension between said first and second apertures, one end of said bundle terminating in a close-packed arrangement of fibers substantially filling said first aperture.

* * * * *

UNITED STATES PATENT AND TRADEMARK OFFICE
CERTIFICATE OF CORRECTION

PATENT NO. : 4503326

DATED : March 5, 1985

INVENTOR(S) : Robert F. Searle

It is certified that error appears in the above-identified patent and that said Letters Patent is hereby corrected as shown below:

Claim 4, column 12, line 25, the words "closed-packed" should be -- close-packed --.

Signed and Sealed this

Eighteenth Day of June 1985

[SEAL]

Attest:

DONALD J. QUIGG

Attesting Officer

Acting Commissioner of Patents and Trademarks